US012162175B2

(12) United States Patent
Ortins et al.

(10) Patent No.: US 12,162,175 B2
(45) Date of Patent: Dec. 10, 2024

(54) SHAVING RAZOR SYSTEM

(71) Applicant: The Gillette Company LLC, Boston, MA (US)

(72) Inventors: Marc Philip Ortins, Reading, MA (US); Kelly Chen, Cambridge, MA (US)

(73) Assignee: The Gillette Company LLC, Boston, MA (US)

( * ) Notice: Subject to any disclaimer, the term of this patent is extended or adjusted under 35 U.S.C. 154(b) by 469 days.

(21) Appl. No.: 17/497,303

(22) Filed: Oct. 8, 2021

(65) Prior Publication Data

US 2022/0184834 A1 Jun. 16, 2022

Related U.S. Application Data

(60) Provisional application No. 63/082,763, filed on Sep. 24, 2020.

(51) Int. Cl.
*B26B 21/52* (2006.01)
*B26B 21/40* (2006.01)

(52) U.S. Cl.
CPC .......... *B26B 21/52* (2013.01); *B26B 21/4012* (2013.01); *B26B 21/4068* (2013.01)

(58) Field of Classification Search
CPC . B26B 21/40; B26B 21/4012; B26B 21/4018; B26B 21/4025; B26B 21/52
(Continued)

(56) References Cited

U.S. PATENT DOCUMENTS 4,083,103 A * 4/1978 Estandian ............... B26B 21/52 30/531
5,070,614 A * 12/1991 Hardin .................. B26B 21/521 30/527
(Continued)

FOREIGN PATENT DOCUMENTS

EP 2918383 A1 9/2015
EP 3398734 A1 11/2018
(Continued)

OTHER PUBLICATIONS

15877—EP Extended European Search Report and Search Opinion; Application No. 21197025.6; dated Feb. 17, 2022; 07 pages.
(Continued)

*Primary Examiner* — Jason Daniel Prone
(74) *Attorney, Agent, or Firm* — John M. Lipchitz

(57) ABSTRACT

A shaving razor system with a shaving razor cartridge having a first face with a first and second of lateral edges, the first face having a cap, a guard and at least one blade between the cap and the guard. A handle having a proximal end mounted to the shaving razor cartridge and a distal end. The handle includes a gripping portion between the proximal end and the distal end with a first lower surface toward the proximal end and a second lower surface toward the distal end. The shaving razor system has a rest position on a generally horizontal resting surface with areas of contact of the shaving razor system to the generally resting horizontal resting surface include the first lower surface, the second lower surface and the first lateral edge. The second lateral edge is spaced apart from the generally horizontal resting surface.

16 Claims, 3 Drawing Sheets

(58) Field of Classification Search
USPC .................................. 30/50, 526–536; D8/48
See application file for complete search history.

(56) References Cited

U.S. PATENT DOCUMENTS

| | | | | | |
|---|---|---|---|---|---|
| 5,860,190 | A | * | 1/1999 | Cano | B25G 1/10 30/322 |
| D408,101 | S | * | 4/1999 | Shurtleff | D28/48 |
| 5,956,796 | A | * | 9/1999 | Lodato | A46B 5/02 15/167.1 |
| 6,161,287 | A | * | 12/2000 | Swanson | B26B 21/4012 30/50 |
| 6,266,888 | B1 | * | 7/2001 | Zowaski | B26B 21/523 30/526 |
| D537,204 | S | * | 2/2007 | Ramm | D28/48 |
| D650,943 | S | * | 12/2011 | Micinilio | D28/46 |
| D651,345 | S | * | 12/2011 | Micinilio | D28/48 |
| 10,092,087 | B2 | * | 10/2018 | Zimmerman | A46B 9/04 |
| D864,482 | S | * | 10/2019 | Goeder | D28/48 |
| D882,174 | S | * | 4/2020 | Goeder | D28/48 |
| D898,285 | S | * | 10/2020 | Goeder | D28/48 |
| 11,504,867 | B2 | * | 11/2022 | Sims | B26B 21/52 |
| D980,526 | S | * | 3/2023 | Waterman | D28/48 |
| D1,001,377 | S | * | 10/2023 | Suhyun | D28/48 |
| 2005/0126007 | A1 | * | 6/2005 | Aviza | B26B 21/4018 30/41 |
| 2014/0150264 | A1 | * | 6/2014 | Micinilio | B26B 21/52 30/41 |
| 2021/0299898 | A1 | * | 9/2021 | McDaniel | B26B 21/522 |

FOREIGN PATENT DOCUMENTS

| | | | |
|---|---|---|---|
| FR | 550149 | A | 2/1923 |
| WO | 2012005839 | A2 | 1/2012 |

OTHER PUBLICATIONS

15877D Extended European Search Report and Search Opinion; Application No. 23150720.3, dated Apr. 20, 2023; 06 pages.
15877D2 Extended European Search Report and Search Opinion; Application No. 23150721.1, dated Jun. 9, 2023; 06 pages.
15877D3 Extended European Search Report and Search Opinion; Application No. 23150723.7, dated Apr. 20, 2023, 06 pages.

* cited by examiner

SHAVING RAZOR SYSTEM

FIELD OF THE INVENTION

The present invention relates to personal care articles and more particularly to shaving razor systems that have a shaving razor cartridge mounted to a handle.

BACKGROUND OF THE INVENTION

In general, a cartridge or blade unit of a safety razor has at least one blade with a cutting edge which is moved across the surface of the skin being shaved by means of a handle to which the cartridge is attached. Some shaving razors are provided with a spring biased cartridge that pivots relative to the handle to follow the contours of the skin during shaving. The cartridge may be mounted detachably on the handle to enable the cartridge to be replaced by a fresh cartridge when the blade sharpness has diminished to an unsatisfactory level, or it may be attached permanently to the handle with the intention that the entire razor be discarded when the blade or blades have become dulled.

Razor blade assemblies have been disclosed wherein cutting edge portions of the blade members are held between skin engaging surfaces which are generally referred to as the guard and cap of the razor blade assembly. The guard contacts the skin in front of the blade member(s) and the cap contacts the skin behind the blade member(s) during a shaving stroke. The cap and guard may aid in establishing the so-called "shaving geometry", i.e., the parameters which determine the blade orientation and position relative to the skin during shaving, which in turn have a strong influence on the shaving performance and efficacy of the razor. The cap may comprise a water leachable shaving aid to reduce drag and improve comfort. The guard may be generally rigid, for example formed integrally with a frame or platform structure which provides a support for the blades. Guards may also comprise softer elastomeric materials to improve skin stretching. However, guards or areas in front of the blade may also include a water leachable shaving aid.

Many modern cartridges for wet shaving razors include a shaving aid body which can comprise a shaving aid material that can include a water soluble polymer such as polyethylene oxide. One suitable polyethylene oxide is manufactured by the Dow Corporation under the trade name POLYOX. Polyethylene oxide is available in a range of molecular weights from about 100,000 to about 8 million. Higher molecular weight polyethylene oxides are preferred for wet shaving applications as these can be more lubricious when wet which is a desirable characteristic for a shaving aid body on a razor cartridge. A blend of high and low molecular weight polyethylene oxides can also be used.

After shaving consumers typically rest their safety razor on a horizontal surface such as a bathroom vanity, the rim of a bathtub or a shelf of a cabinet for storage. When rested as such, the points of contact of typical safety razors are an end portion of the handle and an area of the top face of the shaving razor cartridge. For example, the area of the guard of the cartridge, forward of the cutting edges of the razor blades may contact the resting surface. In some applications a guard of a razor cartridge can be provided with a shaving aid body. Thus, in some situations a wet shaving aid containing portion of a razor cartridge can be rested on or close to a horizontal surface. If the shaving aid body of the rested razor is on or close to the horizontal surface, the shaving aid body may stick to the resting surface. In certain situations, the shaving aid body may detach from the shaving razor cartridge as the shaving razor is pulled off of the resting surface. Also, a film may develop on the shaving aid body resulting in an uneven skin contacting surface resulting in an unpleasant sensation during shaving.

Thus, there is a need for a shaving razor handle design that minimizes contact of the shaving razor cartridge when placed on a surface and helps improve with water runoff and drying of the cartridge without impacting ergonomics or aesthetics of the razor handle design.

SUMMARY OF THE INVENTION

In one aspect, the invention features, in general a shaving razor system with a shaving razor cartridge having a first face with a first and second of lateral edges, the first face having a cap, a guard and at least one blade between the cap and the guard. A handle having a proximal end mounted to the shaving razor cartridge and a distal end. The handle includes a gripping portion between the proximal end and the distal end with a first lower surface toward the proximal end and a second lower surface toward the distal end. The shaving razor system has a rest position on a generally horizontal resting surface with areas of contact of the shaving razor system to the generally resting horizontal resting surface include the first lower surface, the second lower surface and the first lateral edge. The second lateral edge is spaced apart from the generally horizontal resting surface.

In another aspect, the invention features, in general a shaving razor system with a shaving razor cartridge having a longitudinal axis, a first face with a first and second of lateral end, the first face having a cap, least one blade parallel to the longitudinal axis and positioned in front of the cap, a shaving aid body and a guard between the shaving aid body and the at least one blade. A handle having a proximal end mounted to the shaving razor cartridge and a distal end. The handle includes a gripping portion between the proximal end and the distal end with a first lower contact surface toward the proximal end and a second lower contact surface toward the distal end. The shaving razor system has a rest position on a generally horizontal resting surface with the longitudinal axis of the shaving razor cartridge intersecting the generally horizontal resting surface at an included angle of about 7 degrees to about 15 degrees.

BRIEF DESCRIPTION OF THE DRAWINGS

Other features and advantages of the present invention, as well as the invention itself, can be more fully understood from the following description of the various embodiments, when read together with the accompanying drawings, in which.

DETAILED DESCRIPTION OF THE INVENTION

Figure 1:
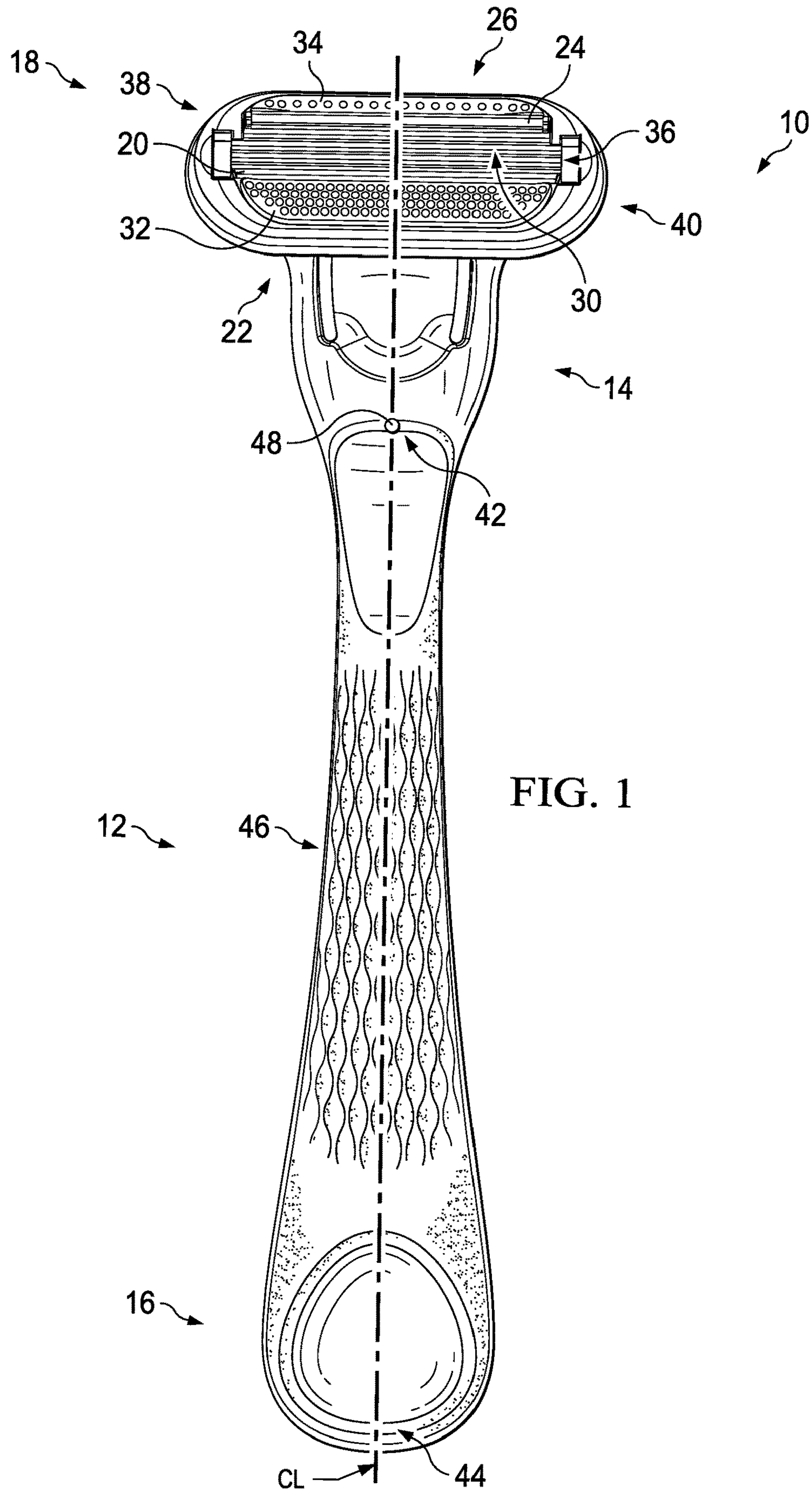
FIG. 1 is a front perspective view of a shaving razor system according to one possible embodiment of the present invention.

Referring to FIG. 1, a front view is shown of a shaving razor system 10. The shaving razor system 10 may include a handle 12 having a proximal end portion 14 and a distal end portion 16. Although a shaving razor is illustrated, it is understood the shaving razor handle 12 may be used for other personal care products, such as tooth brushes and skin applicators. In certain embodiments, the handle 12 may configured to receive a shaving razor cartridge 18. The shaving razor cartridge 18 may be removable or permanently mounted to the handle 12. For example, the shaving razor cartridge 18 may be mounted detachably on the handle 12 to enable the shaving razor cartridge 18 to be replaced by a fresh shaving razor cartridge 18 when the blade sharpness has diminished to an unsatisfactory level, or it may be attached permanently to the handle with the intention that the entire razor be discarded when the blade or blades have become dulled.

The shaving razor cartridge 18 may be molded out of a rigid plastic or manufactured from other materials, such as metal. A guard 20 may be positioned toward a front portion 22 of the shaving razor cartridge 18 and a cap 24 may be positioned toward a rear portion 26 of the shaving razor cartridge 18. The shaving razor cartridge may include or more blades 30 may between the cap 24 and the guard 20 (i.e., in front of the cap 24 and behind the guard 20). A shaving aid body 32 and 34 may be positioned in front of the one or more blades 30 and/or behind the one or more blades 30. The shaving aid body 32 and 34 may be manufactured from a water soluble material to facilitate lubrication during a shaving stroke. The guard 20, the cap 24, the one or more blades 30 and the shaving aid body 32 and 34 may define a first face 36 (i.e., the face of the shaving razor cartridge 18 that faces the surface of the skin during a shaving stroke). The first face 36 may include a first lateral edge 38 and a second lateral edge 40, opposite the first lateral edge 38. In certain embodiments, the first lateral edge 38 and/or the second lateral edge 40 may be spaced apart from the shaving aid body 32 and 34. Accordingly, if the shaving razor system 10 is placed on a resting surface (e.g., a countertop or sink) with one or more of the lateral edges 32 and 34 contacting the resting surface, the shaving aid body 32 and 34 may be spaced apart from the resting surface.

Figure 2:
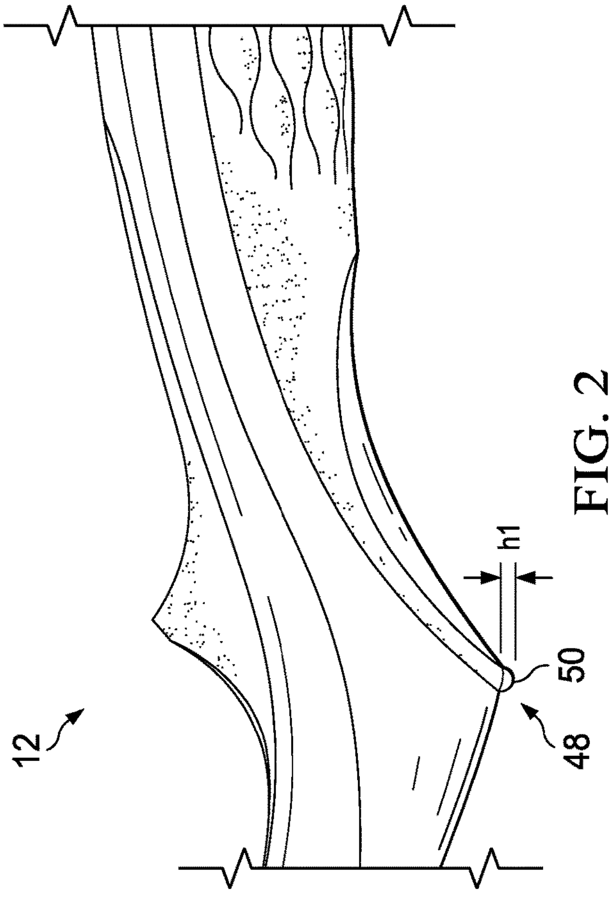
FIG. 2 is a view of the shaving razor system of FIG. 1.

The proximal end portion 14 of the handle 12 may include a first lower surface 42. The distal end of the handle 16 may have a second lower surface 44. A gripping portion 46 may extend between the first lower surface and the second lower surface. The first lower surface 42 may include a terminal protrusion 48. In certain embodiments, the terminal protrusion 48 may be positioned on a center longitudinal axis "CL" of the handle 12. In certain embodiments, the first lower contact surface 42 (e.g., the terminal protrusion 48) may be symmetrically positioned on the a center longitudinal axis "CL" of the handle 12 to facilitate tilting of the shaving razor system 10 towards one of the lateral edges 38 and 40. Accordingly, the shaving razor system 10 may be biased to rest on one of the lateral edges 38 and 40. As shown in FIG. 2, the terminal protrusion 48 may have a height "h1" of about 0.5 mm to about 1.5 mm and more preferably about 0.75 mm to about 1.25 mm. The terminal protrusion 48 may have a convex bottom surface 50. For example, the terminal protrusion may have a circular cross section with a radius of about 0.5 mm to about 1.5 mm and more preferably about 0.75 mm to about 1.25 mm. Accordingly, the width and length of the terminal protrusion may be of about 0.5 mm to about 1.5 mm and more preferably about 0.75 mm to about 1.25 mm.

Figure 3:
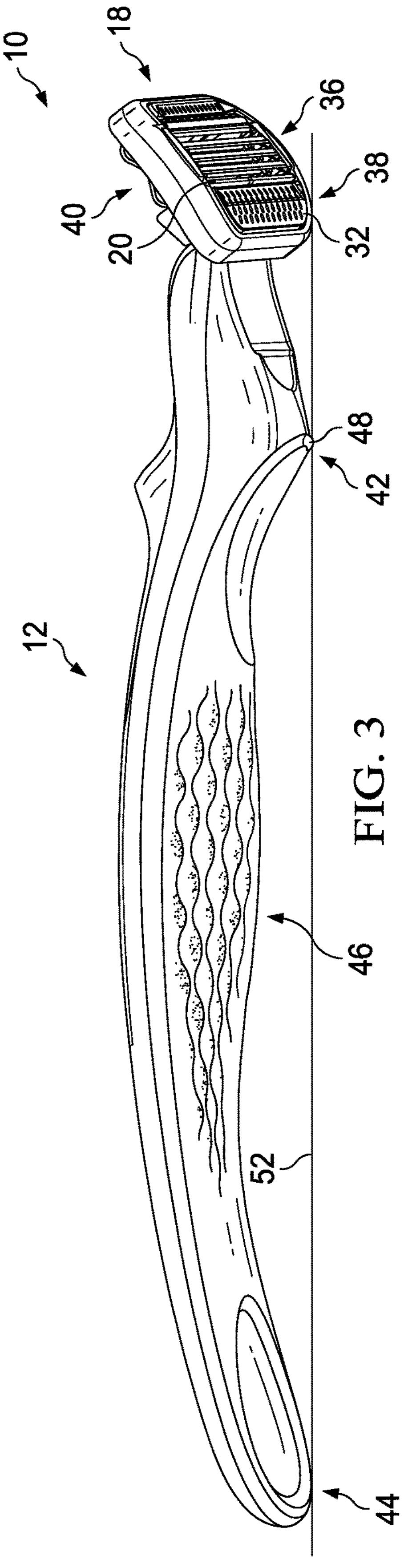
FIG. 3 is a side view of the shaving razor system of FIG. 1 in a rest position.

Referring to FIG. 3, a side view of the shaving razor system 10 is illustrated in a rest position. The rest position may be the position of the first face 36 of the shaving razor cartridge 18 generally faces a generally horizontal resting surface 52 (e.g., a countertop or sink surface) when the shaving razor system 10 is not in use. The gripping portion 46 between the first lower surface 42 and the second lower surface 44 may be concave, thus spacing the gripping portion away from the generally horizontal resting surface 52. The first lower surface 42 (i.e., the terminal protrusion 48) may provide an unstable surface to facilitate the shaving razor system 10 (i.e., the handle 12 and the shaving razor cartridge 18) to tilt to one of the lateral edges 38 and 40, thereby lifting the opposing lateral edge 38 and 40 above the generally horizontal resting surface 52. Accordingly, the rest position of the shaving razor system 10 may be on the generally horizontal resting surface 52 with areas of contact of the shaving razor system 10 to the generally horizontal resting surface 52 includes the first lower surface 42, the second lower surface 44 and the first lateral edge 38, with the second lateral edge 40 spaced apart from the generally horizontal resting surface 52. In certain embodiments, all or a majority of the shaving aid body 32 positioned in front of the blades 30 and/or the guard 20 may not contact the generally horizontal resting surface 52, which may prevent the shaving aid body 32 from sticking to the generally horizontal resting surface 52. The tilting of the shaving razor system 10 (and thus the shaving razor cartridge 18) may facilitate water runoff from the shaving razor cartridge 18 and further aid in drying of the shaving razor cartridge 18. It is understood that in the rest position either one of the lateral edges 38 and 40 may contact the generally horizontal resting surface 52. Furthermore, the user may intentionally rest the shaving razor system 10 such that either one of the lateral edges contacts the generally horizontal resting surface 52. Once of the lateral edges 38 and 40 contacts the generally horizontal resting surface 52 that shaving razor system 10 may not move or tilt back toward the opposing lateral edges 38 and 40 unless an external force is applied.

Figure 4:
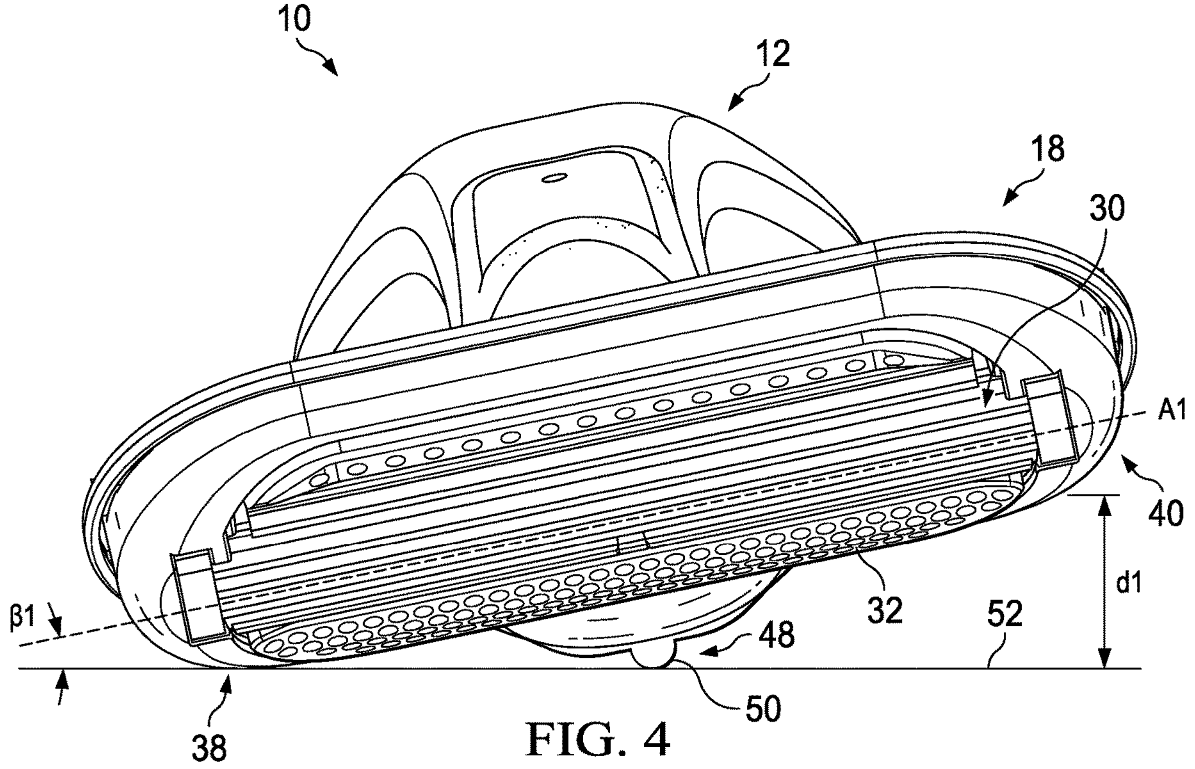
FIG. 4 is a front view of the shaving razor system of FIG. 1 in a rest position.

Referring to FIG. 4, a front view of the shaving razor system 10 is illustrated in the rest position with the handle 12 and the shaving razor cartridge 18 tilted to one side (e.g., the lateral edge 38 contacting the generally horizontal resting surface 52). The shaving razor cartridge 18 may have a longitudinal axis A1 parallel to the at least one blade 30. In the rest position, the axis A1 may intersect the generally horizontal resting surface 52 at an included angle b1 of about 7 degrees to about 15 degrees. In certain embodiments, the second lateral edge 40 may be spaced apart from the generally horizontal resting surface 52 by a distance "d1" of about 5 mm to about 15 mm and more preferably about 8 mm to about 10 mm. The terminal protrusion 48 may facilitate the spacing of the shaving razor cartridge (e.g., shaving aid body 32) partially or completely away from the generally horizontal resting surface 52 by biasing (e.g., tilting) one of the lateral edges 38 and 40 of the shaving razor system 10 towards the generally horizontal resting surface 52 and the other one of the lateral edges 38 and 40 away from the generally horizontal resting surface 52. Accordingly, the relatively small terminal protrusion 48 may facilitate the drying of the shaving razor cartridge 18 and prevent sticking of the shaving aid body 32 without significantly impacting the overall geometry and aesthetics of the handle 12. For example, if the shaving razor cartridge 18 was to be raised completely away from the generally horizontal resting surface 52 in a rest position without tilting, the first lower surface 42 would need to be extended further toward the generally horizontal resting surface 52 and the proximal end portion 14 of the handle 12 would need to be extended at an angle away from the horizontal resting surface 52, thus negatively impacting aesthetics and ergonomics of the handle 12. The convex bottom surface 50 may further facilitate the tilting of the shaving razor system 10.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm." Furthermore, dimensions should not be held to an impossibly high standard of metaphysical identity that does not allow for discrepancies due to typical manufacturing and/or measuring tolerances. Therefore, the term "about" should be interpreted as being within typical manufacturing and measuring tolerances.

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A shaving razor system, comprising:

a shaving razor cartridge having a first face with a first and second of lateral edges, the first face having a cap, a guard and at least one blade between the cap and the guard; and a handle having a proximal end mounted to the shaving razor cartridge and a distal end, the handle including a gripping portion between the proximal end and the distal end with a first lower surface at the proximal end and a second lower surface at the distal end, wherein the shaving razor system has a rest position on a horizontal resting surface with areas of contact of the shaving razor system to the horizontal resting surface include the first lower surface, the second lower surface and the first lateral edge wherein the second lateral edge is spaced apart from the horizontal resting surface, wherein the first lower surface includes an unstable semicircular terminal protrusion that facilitates the handle and the shaving razor cartridge to tilt to the rest position.

2. The shaving razor system of claim 1 further comprising a shaving aid body in front of the guard.

3. The shaving razor system of claim 2 wherein the shaving aid body is completely spaced apart from the horizontal resting surface when in the rest position.

4. The shaving razor system of claim 1 wherein the terminal protrusion is positioned on a center longitudinal axis of the handle.

5. The shaving razor system of claim 1 wherein the terminal protrusion has a height of about 0.5 mm to about 1.5 mm.

6. The shaving razor system of claim 1 wherein the terminal protrusion has a width and a length of about 0.5 mm to about 1.5 mm.

7. The shaving razor system of claim 1 wherein the second lateral edge is spaced apart from the horizontal surface by about 15 mm when in the rest position to about 15 mm.

8. The shaving razor system of claim 1 wherein a longitudinal axis of the shaving razor cartridge intersects the horizontal resting surface at an included angle of about 7 to about 15 degrees when in the rest position.

9. A shaving razor system, comprising:

a shaving razor cartridge having a longitudinal axis, a first face with a first and second of lateral edge, the first face having a cap, least one blade positioned in front of the cap, a shaving aid body and a guard between the shaving aid body and the at least one blade; and a handle having a proximal end mounted to the shaving razor cartridge and a distal end, the handle including a gripping portion between the proximal end and the distal end with a first lower surface at the proximal end and a second lower surface at the distal end, wherein the shaving razor system has a rest position where the first lower surface, the second lower surface, and one of the lateral edges are on a horizontal resting surface with the longitudinal axis of the shaving razor cartridge intersecting the horizontal resting surface at an included angle of about 7 degrees to about 15 degrees.

10. The shaving razor system of claim 9 wherein the shaving aid body is spaced apart from the horizontal resting surface when in the rest position.

11. The shaving razor system of claim 10 wherein the shaving aid body is spaced completely apart from the horizontal resting surface when in the rest position.

12. The shaving razor system of claim 9 wherein the first lower contact surface comprises a terminal protrusion.

13. The shaving razor system of claim 12 wherein the terminal protrusion has a convex bottom surface that contacts the horizontal surface to facilitate the shaving razor system tilting to the rest position.

14. The shaving razor system of claim 13 wherein the terminal protrusion is positioned on a center longitudinal axis of the handle.

15. The shaving razor system of claim 9 wherein the other one of the lateral edges is spaced apart from the horizontal resting surface by about 5 mm to about 15 mm when in the rest position.

16. The shaving razor system of claim 15 wherein the other one of the lateral edges is spaced apart from the generally horizontal resting surface by about 8 mm to about 10 mm when in the rest position.

* * * * *